(12) United States Patent
Fukami et al.

(10) Patent No.: US 6,179,396 B1
(45) Date of Patent: Jan. 30, 2001

(54) BRAKE CONTROL APPARATUS INCLUDING DUTY CONTROLLED VALVE

(75) Inventors: Masanobu Fukami, Aichi-ken; Kenji Tozu, Yokkaichi; Takayuki Itoh, Nagoya; Satoshi Yokoyama, Nishio, all of (JP)

(73) Assignee: Aisin Seiki Kabushiki Kaisha, Kariya (JP)

( * ) Notice: Under 35 U.S.C. 154(b), the term of this patent shall be extended for 0 days.

(21) Appl. No.: 09/220,600

(22) Filed: Dec. 28, 1998

(30) Foreign Application Priority Data

Dec. 25, 1997 (JP) .................................... 9-356973

(51) Int. Cl.$^7$ .................................. B60T 8/34; B60T 8/48
(52) U.S. Cl. ......................................... 303/155; 303/113.4
(58) Field of Search .................... 303/113.4, 155

(56) References Cited

U.S. PATENT DOCUMENTS

| | | |
|---|---|---|
| 5,188,437 | 2/1993 | Willmann . |
| 5,570,935 * | 11/1996 | Monzaki ............... 303/155 |
| 5,607,209 | 3/1997 | Narita et al. . |
| 5,727,852 | 3/1998 | Pueschel et al. . |
| 6,019,438 * | 2/2000 | Sawada et al. .......... 303/113.4 |

FOREIGN PATENT DOCUMENTS

| | | |
|---|---|---|
| 195 01 760 | 7/1996 | (DE) . |
| 195 25 800 | 1/1997 | (DE) . |
| 196 15 805 | 10/1997 | (DE) . |
| 2 297 134 | 7/1996 | (GB) . |
| 2 326 452 | 12/1998 | (GB) . |
| 5-116609 | 5/1993 | (JP) . |
| 7-329766 | 12/1995 | (JP) . |
| 8-230634 | 9/1996 | (JP) . |
| 9-254773 | 9/1997 | (JP) . |

* cited by examiner

Primary Examiner—Matthew C. Graham
(74) Attorney, Agent, or Firm—Burns, Doane, Swecker & Mathis, LLP

(57) ABSTRACT

A brake control apparatus includes a first valve for opening and closing a main line, a pump having an inlet port and an outlet port to supply pressurized brake fluid to a point between the main line and the wheel cylinder, an auxiliary line Mfc connecting the inlet port of the pump to a master cylinder, a second valve for opening and closing the auxiliary line, a brake operation sensor for detecting the operation of a brake pedal, and an electronic controller which controls the first valve, the second valve, and the hydraulic pump. The electronic controller judges the need for brake assist control based on the detection by the brake operation sensor and controls the first valve, the second valve and the pump to perform the brake assist control. The electronic control unit also controls the duty ratio for the second valve based on the detection of the brake operation sensor. According to the present invention, the duty ratio is determined based on the detection of the brake operation sensor when the brake assist control is judged to be necessary. The electronic control unit immediately drives the second valve with the determined duty ratio so that the pressure is promptly increased in the wheel cylinder in accordance with the driver's operation of the brake pedal.

5 Claims, 12 Drawing Sheets

BRAKE CONTROL APPARATUS INCLUDING DUTY CONTROLLED VALVE

This application corresponds to and claims priority under 35 U.S.C. §119 with respect to Japanese Application No. 09(1997)-356973 filed on Dec. 25, 1997, the entire content of which is incorporated herein by reference.

FIELD OF THE INVENTION

The present invention generally relates to a brake control apparatus. More particularly, the present invention pertains to a brake control apparatus that increases or boosts the braking force when the driver applies a rapid or deep depressing force to the brake pedal.

BACKGROUND OF THE INVENTION

Under emergency situations, a driver may rapidly depress a brake pedal. However, the driver may not depress the brake pedal sufficiently or the driver may not maintain a sufficient force for a necessary period of time. Thus, to improve vehicle safety, some automatic brake assisting systems have been introduced in the market. Such known brake assisting systems employ a vacuum booster to automatically boost the braking force when the driver depresses the brake pedal rapidly.

Japanese Laid-Open Patent Publication No. H08-230634 published on Sep. 10, 1996, which corresponds to U.S. Pat. No. 5,727,852, discloses a brake assisting system in which a pump for anti-skid control or traction control is also used for boosting the braking force to reduce the role of the vacuum booster. This system includes a wheel cylinder, a master cylinder, a main line connecting the master cylinder to the wheel cylinder, a first valve to open and close the main line, a pump having an inlet port and an outlet port to supply pressurized brake fluid to a point between the first line and the wheel cylinder, an auxiliary line connecting the inlet port of the pump to the master cylinder, and a second valve to open and close the auxiliary line.

This known system also includes a pressure sensor to detect the output pressure from the master cylinder. The pump, the first valve and the second valve perform brake assistance under proper control when the output pressure and the pressure increase ratio exceeds the predetermined value. To increase the pressure, the first valve is opened and the second valve is closed. Then, the pressure increase rate is controlled by turning on and off the pressure pump. However, in this known system, the proper pressure increase rate may not be obtained in accordance with the driver's brake pedal operation when the electric motor keeps turning on.

It may be possible to obtain the proper pressure increase rate by turning on and off the electric motor. However, the pump may not discharge a sufficient amount of brake fluid from the reservoir because the pressure in the reservoir is less than the pressure in the master cylinder under anti-skid control. Accordingly, due to less discharge by the pump, the reservoir may be full so that anti-skid control may not be properly performed.

In light of the foregoing, a need exists for a brake control apparatus that is not susceptible to the foregoing drawbacks and disadvantages.

It would thus be desirable to provide a brake control apparatus that is able to simultaneously perform brake assist control and anti-skid control.

It would also be desirable to provide a brake control apparatus that is able to increase the brake pressure in a wheel cylinder immediately after initiation of brake assist control.

It would be further desirable to provide a brake control apparatus that is able to control the brake pressure in a wheel cylinder according to a driver's brake operation.

SUMMARY OF THE INVENTION

The present invention provides a brake control apparatus that includes a wheel cylinder for applying a brake force to a wheel, a master cylinder which generates pressurized brake fluid according to the operation of a brake pedal, a main hydraulic line to connect the master cylinder to the wheel cylinder, a first valve that opens and closes the main line, and a pump having an inlet port and an outlet port for supplying pressurized brake fluid to a point between the main line and the wheel cylinder. An auxiliary line connects the inlet port of the pump to the master cylinder, and a second valve opens and closes the auxiliary line. A brake operation sensor detects the operation of the brake pedal and an initiation judging device determines the necessity of a brake assist control based on the detection by the brake operation sensor. A controller controls the first valve, the second valve and the pump to perform brake assist control after the determination by the initiation judging device. The controller includes a duty control device which controls the second valve with a determined duty ratio based on the detection by the brake operation sensor.

According to the present invention, the duty ratio is determined based on the detection by the brake operation sensor when the brake assist control is judged to be necessary. The controller immediately drives the second valve with the determined duty ratio so that the pressure is promptly increased in the wheel cylinder in accordance with the driver's operation of the brake pedal.

BRIEF DESCRIPTION OF THE DRAWING FIGURES

Additional features and characteristics of the present invention will become more apparent from the following detailed description considered with reference to the accompanying drawing figures in which like elements are designated by like reference numerals wherein.

DETAILED DESCRIPTION OF THE PREFERRED EMBODIMENT

Figure 1:
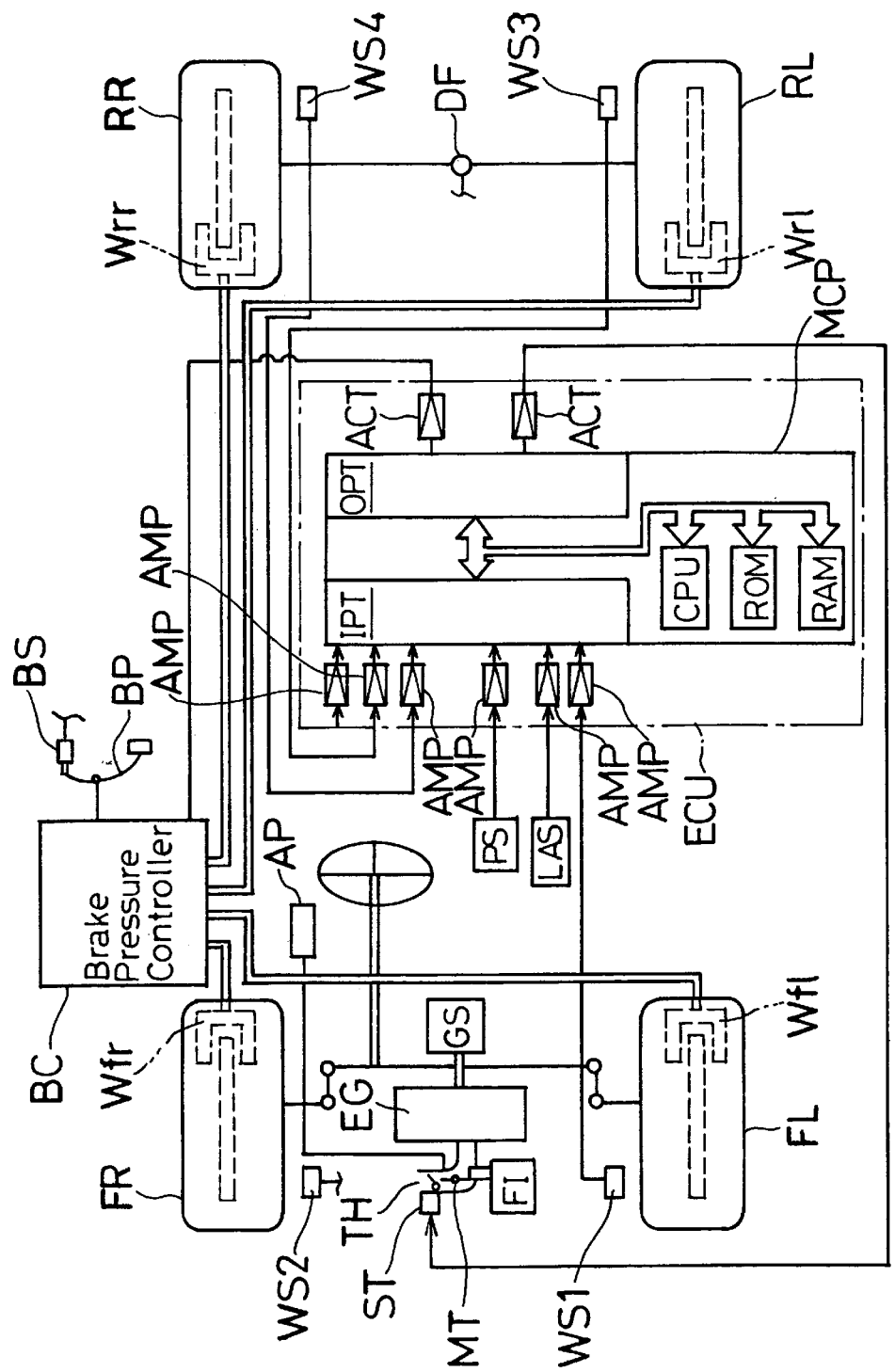
FIG. 1 is a schematic block diagram showing the entire system according to the present invention.

Referring initially to FIG. 1, the system according to the present invention includes an internal combustion engine EG connected to a throttle controller TH and a fuel injector FI. The throttle controller TH controls a main throttle valve MT and a subthrottle valve ST. The main throttle valve MT is controlled in accordance with the driver's operation of an accelerator pedal AP. The sub-throttle valve ST is controlled by an electronic control unit ECU. The electronic control unit ECU also controls the fuel injector FI to adjust the amount of fuel supplied to the internal combustion engine EG. In this embodiment, the internal combustion engine EG drives the rear wheels RR, RL through a drive train GS and differential gear DF. Thus, this embodiment employs a so called rear wheel drive system. However, it is to be understood that the present invention may also be adapted for us in other drive systems, such as front wheel drive systems and all wheel drive systems.

The right and left front wheels FR, FL include respective wheel cylinders Wfr, Wfl. The right and left rear wheels RR, RL also include respective wheel cylinders Wrr, Wrl. All of the wheel cylinders Wfr, Wfl, Wrr, Wrl are hydraulically connected to a brake pressure controller BC. Additional details associated with the brake pressure controller BC will be described below with reference to FIG. 2.

Each of the wheels FR, FL, RR, RL includes a respective wheel speed sensor WS1, WS2, WS3, WS4. These speed sensors WS1, WS2, WS3, WS4 are all electrically connected to the electronic control unit ECU to supply pulse signals to the electronic control unit ECU indicative of the individual speeds of the wheels FR, FL, RR, RL. Further, the brake pressure controller BC includes a master cylinder MC and a pressure sensor PS. The pressure sensor PS detects an output pressure Pmc from the master cylinder MC. The pressure sensor PS is electrically connected to the electronic control unit ECU to supply a signal indicating the output pressure Pmc to the electronic control unit ECU. The master cylinder MC is mechanically connected to a brake pedal BP to receive the driver's brake pedal operation. The brake pedal BP is equipped with a brake switch BS. The brake switch BS is turned on when the driver depresses the brake pedal BP. The brake switch BS supplies an electric signal to the electronic control unit ECU representing the driver's operation of the brake pedal.

The electronic control unit ECU also receives signals from a steering angle sensor (not shown) which detects the steering angle of the front wheels FR, FL. Further, the electronic control unit ECU receives signals from a lateral acceleration sensor LAS which detects the lateral acceleration Gy of a vehicle and from a yaw rate sensor (not shown) which detects the yaw rate of the vehicle.

The electronic control unit ECU includes a micro computer MCP. The micro computer MCP further includes a central processing unit CPU, read only memories ROM, random access memories RAM, input ports IPT and output ports OPT. Various signals are amplified by amplifiers AMP and are fed to the central processing unit CPU from the wheel speed sensors WS1, WS2, WS3, WS4, the pressure sensor PS, the brake switch BS, the steering angle sensor, the yaw rate sensor, and the lateral acceleration sensor LAS. Further, various signals are supplied from the central processing unit CPU to the throttle controller TH and the brake pressure controller BC through drivers ACT.

The micro computer MCP executes the programs shown in FIGS. 3, 4, 5, 6, 8 and 9 when an ignition switch is closed to operate the internal combustion engine EG. These programs are stored in the read only memories ROM. The micro computer MCP temporally stores variables in the random access memories RAM to execute the programs. It is to be understood that multiple micro computers can be employed for various tasks defined by the programs.

Figure 2:
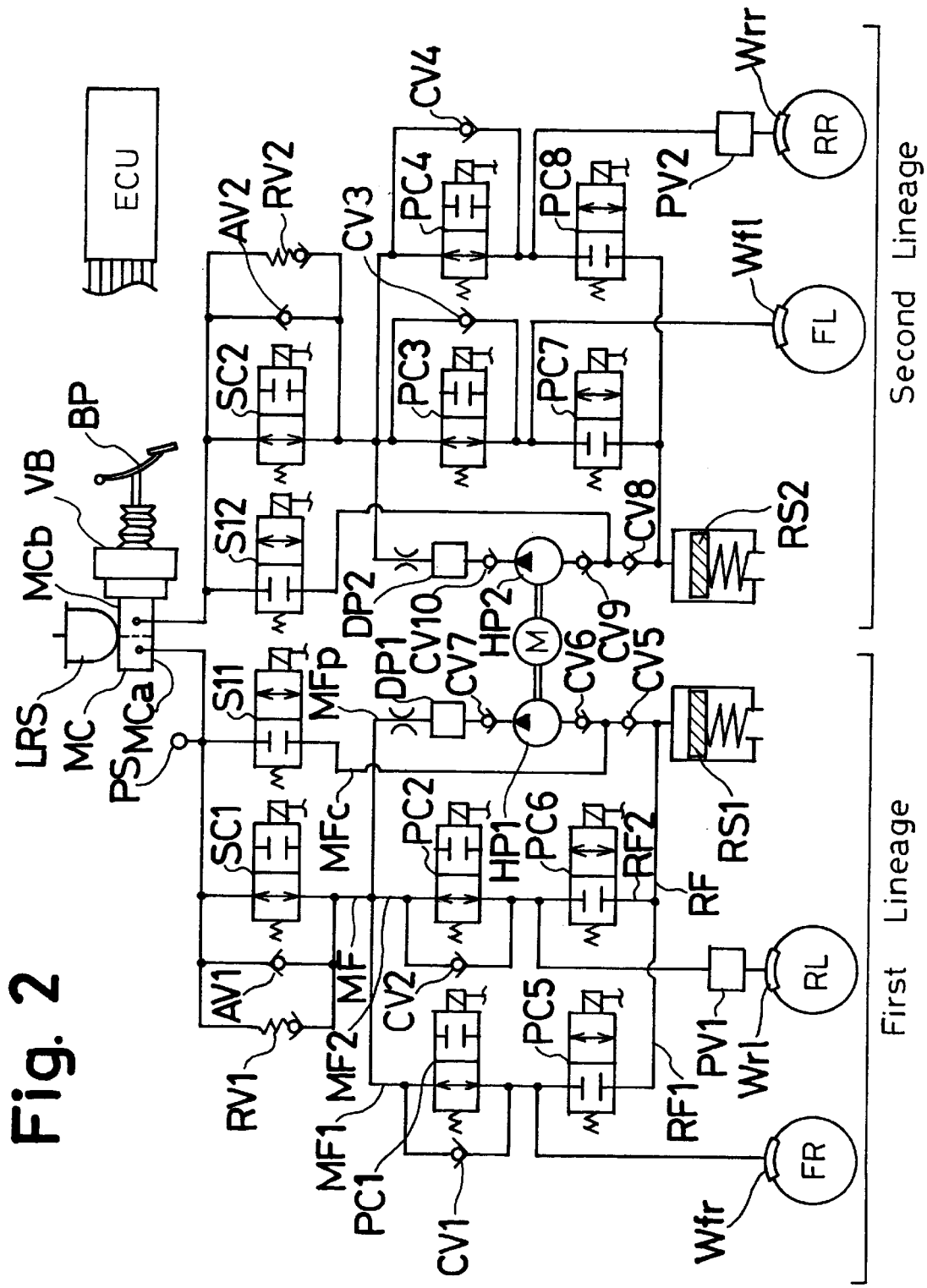
FIG. 2 is a circuit diagram showing the brake fluid circuit according to the present invention.

FIG. 2 is a circuit diagram showing the brake pressure controller BC. The master cylinder MC is driven by a vacuum booster VB in accordance with the driver's operation of the brake pedal BP. When the driver operates the brake pedal BP, the master cylinder MC pressurizes brake fluid stored in a master reservoir LRS and supplies the pressurized brake fluid to a first hydraulic line and a second hydraulic line. The first line connects a first pressure chamber MCa of the master cylinder MC to the wheel cylinders of the front right wheel FR and the rear left wheel RL. The second line connects a second pressure chamber MCb of the master cylinder MC to the wheel cylinders of the front left wheel FL and the rear right wheel RR. The master cylinder MC in this embodiment is a tandem type master cylinder and the first and the second lines constitute a diagonal type hydraulic brake.

In the first line for wheel cylinders Wfr, Wrl, the first pressure chamber MCa is connected to a main flow passage MF. The main flow passage MF branches off into two passages MF1, MF2. One of the branch passages MF1 is connected to the wheel cylinder Wfr. The other branch passage MF2 is connected to the wheel cylinder Wrl. An open/close valve SC1 is located in the main flow passage MF. The valve SC1 is a so-called cut valve and is normally open. Further, the first pressure chamber MCa is connected to a pair of one-way valves CV5, CV6 through an auxiliary flow passage MFc. The pressure sensor PS is connected to the auxiliary flow passage MFc to detect the output pressure Pmc from the master cylinder MC. To detect that the driver is operating the brake pedal BP, the pressure sensor PS may be used instead of the brake switch BS. It is possible to use a brake stroke sensor instead of the brake switch BS to detect operation of the brake pedal.

An open/close valve PC1 is located in the branch passage MF1 and an open/close valve PC2 is located in the branch passage MF2. These valves PC1, PC2 are normally open. A one-way valve CV1 is located in parallel to the valve PC1 and a one-way valve CV2 is located in parallel to the valve PC2. These one-way valves CV1, CV2 only allow brake fluid to flow towards the mater cylinder MC. The brake fluid in the wheel cylinders Wfr, Wrl are returned to the master cylinder MC and the master cylinder reservoir LRS through the one-way valves CV1, CV2 and the valve SC1. Accordingly, when the driver releases the brake pedal BP, fluid pressure in the wheel cylinders Wfr, Wrl is able to quickly follow the decreasing output pressure Pmc from the master cylinder MC. The wheel cylinder Wfr is also connected to a return flow branch passage RF1 through an open/close valve PC5 while the wheel cylinder Wrl is also connected to a return flow branch passage RF2 through an open/close valve PC6. The valves PC5, PC6 are normally closed. The return flow branch passages RF1, RF2 are joined to a return flow passage RF. The return flow passage RF is connected to a auxiliary reservoir RS1.

An inlet port of a first hydraulic pump HP1 is connected to the auxiliary reservoir RS1 through the one-way valves CV6, CV5. An outlet port of the hydraulic pump HP1 is connected to the valves PC1, PC2 through a one-way valve CV7 and a fluid passage MFp. The hydraulic pump HP1 is driven by an electric motor M to draw in brake fluid from the inlet port and supply pressurized brake fluid from the outlet. The electric motor M serves as a common drive for both the first hydraulic pump HP1 and a second hydraulic pump HP2 which is operatively connected to the second line. The auxiliary reservoir RS1 is also referred to as an accumulator and is independent from the master cylinder reservoir LRS. The auxiliary reservoir RS1 includes a movable piston and a spring so that a predetermined amount of brake fluid may be temporarily conserved or stored in the auxiliary reservoir RS1.

The master cylinder MC is connected to the one-way valves CV5, CV6 through the auxiliary flow passage MFc. The one-way valve CV5 cuts off brake fluid flow from the master cylinder MC to the auxiliary reservoir RS1, but allows counter flow from the auxiliary reservoir RS1 to the master cylinder MC. The one-way valves CV6, CV7 allow brake fluid flow from the inlet port to the outlet port of the hydraulic pump HP1. The one-way valves CV6, CV7 are typically integrated with the hydraulic pump HP1. An open/close valve SI1 is located in the auxiliary flow passage MFc. The valve SI1 is normally closed to cut off the master cylinder MC from the inlet port of the hydraulic pump HP1. In other words, the inlet port of the hydraulic pump HP1 is connected to the master cylinder MC when the valve SI1 is opened by the electronic control unit ECU.

A relief valve RV1 and one-way valve AV1 are connected in parallel to the valve SC1. To adjust the output pressure from the hydraulic pump HP1, the relief valve RV1 cuts off brake fluid flow from the master cylinder MC to the valves PC1, PC2, but allows the counter flow of brake fluid when a pressure difference between the main flow passage MF and the master cylinder MC exceeds a predetermined value. The one-way valve AV1 allows brake fluid flow toward the wheel cylinders Wfr, Wrl but cuts off or prevents the counter flow of brake fluid. Due to the one-way valve AV1, when the driver depresses the brake pedal BP, the pressure in the wheel cylinders Wfr, Wrl is increased even while the valve SC1 is closed. A dumper DP1 is also disposed at the outlet port of the hydraulic pump HP1 and a proportioning valve PV1 is disposed before the inlet port of the rear wheel cylinder Wrl.

The second line for the wheels cylinders Wfl, Wrr associated with the front left wheel and the rear right wheel consists of the same elements and fluid circuits as the first line described above. The second line includes an auxiliary reservoir RS2 corresponding to the auxiliary reservoir RS1, a dumper DP2 corresponding to the dumper DP1, a proportioning valve PV2 corresponding to the proportioning valve PV1, a normally opened valve SC2 corresponding to the normally opened valve SC1, a normally closed valve SI2 corresponding to the normally closed valve SI1, a plurality of valves PC3, PC4, PC7, PC8 corresponding to the valves PC2, PC1, PC6, PC5, a plurality of one-way valves CV3, CV4, CV8, CV9, CV10 corresponding to the one-way valves CV2, CV1, CV5, CV6, CV7, a relief valve RV2 corresponding to the relief valve RV1, and a one-way valve AV2 corresponding to the one-way valve AV1. Also, as noted above, the hydraulic pump HP2 is driven together with the hydraulic pump HP1 by the common electric motor M.

The electronic control unit ECU controls the electric motor M, the valves SC1, SC2, SI1, SI2 and the valves PC1, PC2, PC3, PC4, PC5, PC6, PC7, PC8 to perform brake assist control, anti-skid control, vehicle stability control (i.e., over-steer/under-steer reduction control), front and rear braking force distribution control and traction control.

Figure 3:
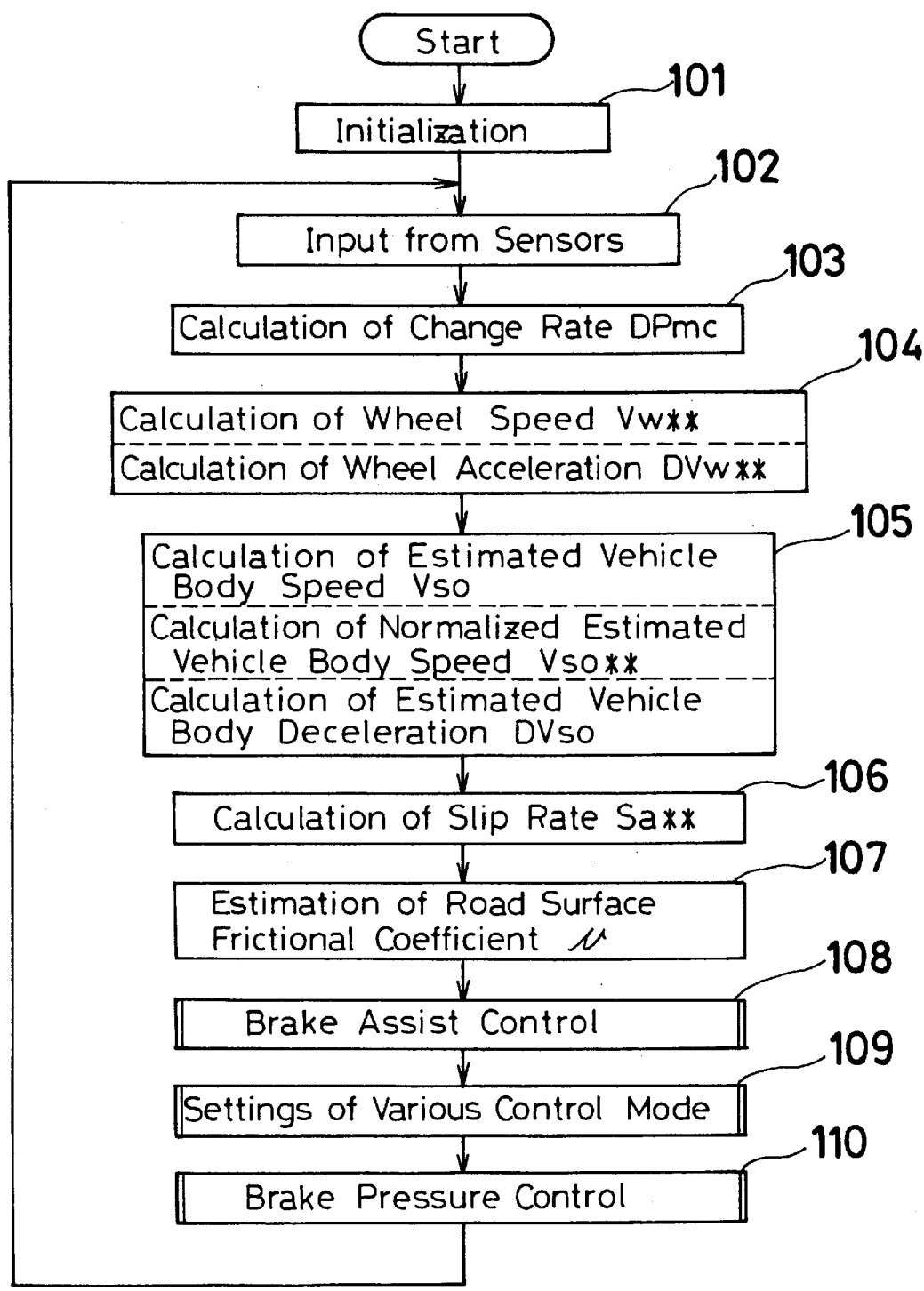
FIG. 3 is a flow chart showing the overall control according to the present invention.

FIG. 3 is a general flow chart showing the overall control that is carried out in accordance with the present embodiment. At step 101, the micro computer MCP is initialized to clear variables and reset the input and output ports. At step 102, signals are received from the wheel speed sensors WS1, WS2, WS3, WS4 and the pressure sensor PS. Further, at the step 102, signals are also received from the steering angle sensor, the yaw rate sensor and the lateral acceleration sensor LAS.

At step 103, the output pressure Pmc from the master cylinder MC is differentiated so that a change rate DPmc of the output pressure Pmc is calculated. At step 104, each wheel speed Vw is calculated. As used herein, the characters "" refer to one of the wheels FR, FL, RR, RL. Also at step 104, each wheel speed Vw is differentiated so that each wheel acceleration DVw is also calculated. At step 105, an estimated vehicle body speed Vso is calculated at the center of gravity of the vehicle body through use of the formula: Vso=MAX (Vw). In other words, the estimated vehicle body speed is equal to the largest wheel speed Vw. At step 105, each respective estimated vehicle body speed Vso is also calculated at each wheel FR, FL, RR, RL. Also, if necessary, the respective vehicle body speeds Vso may be normalized to reduce errors due to a turn of the vehicle body. Furthermore, at step 105, a vehicle body deceleration DVso in the fore-aft direction of the vehicle body is calculated at the center of gravity of the vehicle body. The vehicle body deceleration DVso is determined by differentiating the estimated vehicle body speed Vso. It is to be understood that the vehicle body deceleration means the same thing as the vehicle body acceleration except for a difference in sign.

At step 106, a slip rate Sa for each wheel FR, FL, RR, RL is calculated based on each wheel speed Vw and each body speed Vso (or the normalized vehicle body speed) through use of the formula: Sa=(Vso−Vw)/Vso. At step 107, a road surface frictional coefficient $\mu$ is approximately estimated based on the vehicle body deceleration DVso and the lateral acceleration Gy through use of the formula: $\mu=(DVso^2+Gy^2)_{1/2}$. It may also be possible to estimate the road surface frictional coefficient $\mu^{}$ for each wheel FR, FL, RR, RL based on the road surface frictional coefficient $\mu$ and each estimated wheel cylinder pressure Pw**.

At step 108, the brake assist control is performed. The details associated with the brake assist control is explained below. At step 109, various control modes and target slip rates are set to perform brake assist control, anti-skid control, vehicle stability control (i.e., over-steer/under-steer reduction control), front and rear braking force distribution control and traction control. At step 110, the hydraulic pressures are controlled by the brake pressure controller BC so that the braking forces are controlled at the wheels FR, FL, RR, RL. For the brake assist control, the brake pressure controller BC controls the electric motor M and the valves SC1, SC2, SI1, SI2.

Figure 4:
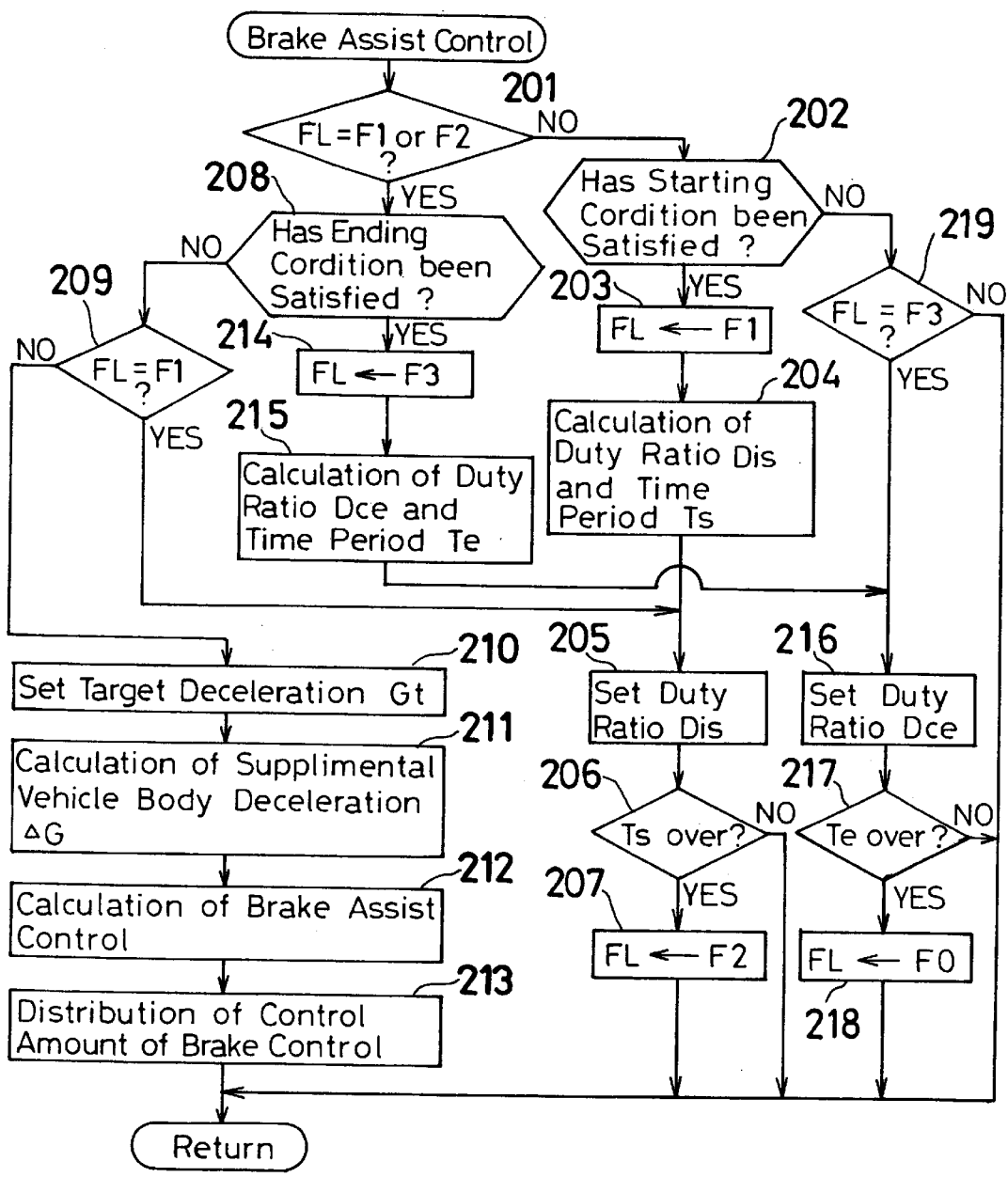
FIG. 4 is flow chart showing the brake assist control step forming a part of the flow chart in FIG. 3.
Figure 10:
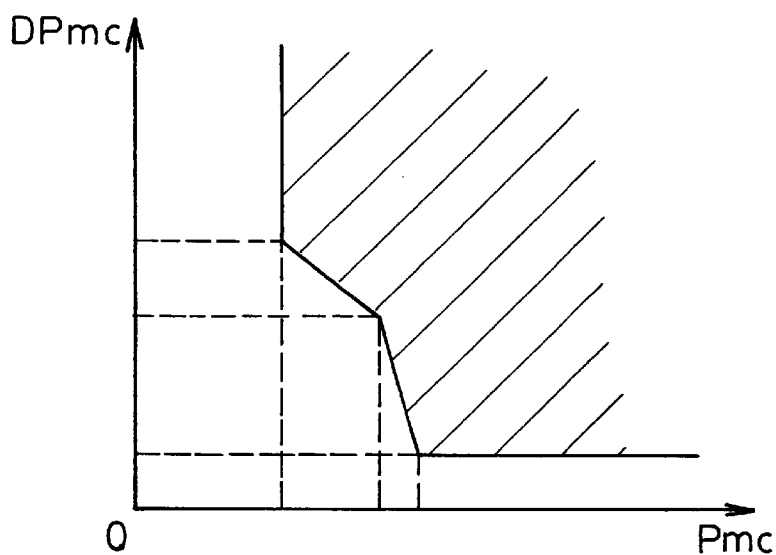
FIG. 10 is a graph showing the start area for brake assist control.

Referring to FIG. 4, the brake assist control at step 108 of the flow chart shown in FIG. 3 is explained in more detail. At step 201, a brake assist control flag FL is checked. Unless the flag FL is equal to an initiation flag F1 or a working flag F2, step 202 is executed. The flag F1 represents that the brake assist control has already started, but is in an initial time period. The flag F2 indicates that the brake assist control is actively working. At step 202, the electronic control unit ECU judges if the starting condition for the brake assist control has been satisfied. If the starting condition is satisfied at the step 202, step 203 is executed to set the control flag FL to the initiation flag F1. Here, the brake assist control starts under the cross-hatched area in FIG. 10 where (a) the output pressure Pmc from the master cylinder MC exceeds certain values and (b) the change rate DPmc of the output pressure Pmc exceed certain rates.

At step 204, the electronic control unit ECU determines a duty ratio Dis for the valves SI1, SI2 and a time period Ts for the initial time period. At step 205, the electronic control unit ECU sets the duty ratio Dis to the value resulting from step 204 for the valves SI1 and SI2. The electronic control unit ECU also sets another duty ratio to 100% for the valves SC1 and SC2 at the step 205. At step 206, the electronic control unit ECU judges if the time period Ts has elapsed. If the time period Ts has not yet elapsed, the electronic control unit ECU returns to the main routine shown in FIG. 3. Otherwise, the electronic control unit ECU executes step 207 to set the control flag FL to the working flag F2. After step 207, the electronic control unit ECU returns to the main routine shown in FIG. 3.

If it is determined in step 201 that the flag FL is equal to the initiation flag F1 or the working flag F2, step 208 is executed. At the step 208, the electronic control unit ECU judges if at least one of the ending conditions for the brake assist control has been satisfied. Here, the ending conditions are: (e) the brake switch BS is turned off (i.e., the driver has released the brake pedal BP); or (f) the estimated vehicle body speed Vso is less than a certain value at the center of gravity of the vehicle body; or (g) the output pressure Pmc is less than a certain pressure Pa (e.g., 1 mega-PASCAL); or (h) the output pressure Pmc exceeds a certain pressure Pb where the certain pressure Pb represents the minimum pressure to lock any wheel on a normal (or nonslippery) road surface. If it is determined at step 208 that none of the ending conditions is satisfied, the electronic control unit ECU executes step 209 to judge the control flag FL. At step 209, if the control flag is equal to the initiation flag F1, the electronic control unit ECU executes steps 205, 206 and 207 as described above. At step 209, if the control flag FL is not equal to F1 (i.e., if the control flag FL is equal to the working flag F2), the electronic control unit ECU executes step 210.

Figure 13:
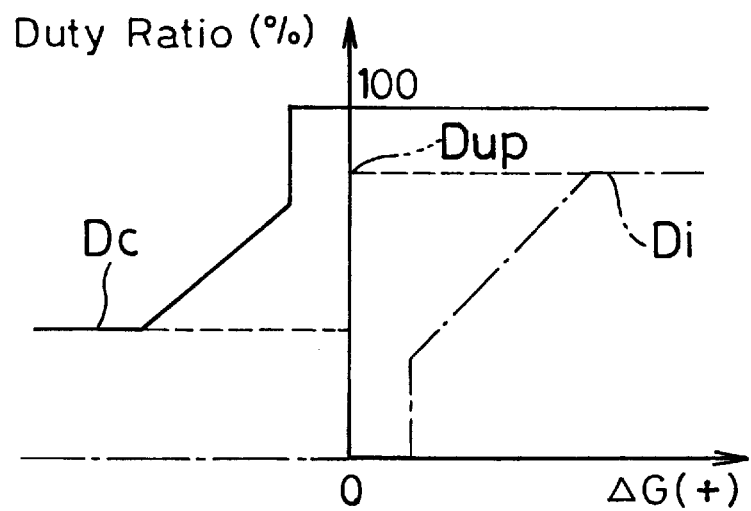
FIG. 13 is a graph showing the relationship between deviations of the vehicle body deceleration and duty ratios for the first and second valves.

At step 210, the electronic control unit ECU sets a target deceleration Gt. The electronic control unit ECU first determines a vehicle body deceleration Gm based on the output pressure Pmc of the master cylinder MC. Then, the electronic control unit ECU also selects one of constant declarations Δg for the brake assist control in accordance with the output pressure Pmc of the master cylinder MC to add the selected constant deceleration Δg to the vehicle body deceleration Gm. In other words, the target deceleration Gt is the sum of the vehicle body deceleration Gm and the selected constant deceleration Δg, which means that the target deceleration Gt is set in accordance with the output pressure Pmc of the master cylinder MC. At step 211, the electronic control unit ECU calculates the difference between the target deceleration Gt and the vehicle body deceleration DVso which is referred as a supplemental vehicle body deceleration ΔG in this application. At step 212, the electronic control unit ECU calculates the control amount of brake assistance in accordance with the supplemental vehicle body deceleration ΔG. In other words, the electronic control unit ECU sets the duty ratios Di and Dc as shown in FIG. 13.

More specifically, while the brake pressure is increased and the supplemental vehicle body deceleration ΔG is positive, the duty ratio Di for the valves SI1, SI2 is set in proportion to the supplemental vehicle body deceleration ΔG and the duty ratio Dc is set to nearly 100% to substantially close the valves SC1, SC2. In contrast, while the brake pressure is decreased and the supplemental vehicle body deceleration ΔG is negative, the duty ratio Dc for the valves SC1, SC2 is set in proportion to the supplemental vehicle body deceleration ΔG and the duty ratio Di is set to nearly zero % to substantially close the valves SI1, SI2. The duty ratio Di for the valves SI1, SI2 has an upper limit Dup so that the duty ratio Di does not exceed the upper limit Dup regardless of the supplemental vehicle body deceleration ΔG. Due to the upper limit Dup, the hydraulic pumps HP1, HP2 may not draw in an excessive amount of brake fluid from the master cylinder MC. Therefore, the brake pedal BP may not sink regardless of the driver's operation. Further, output pressure Pmc from the master cylinder MC may be stabilized.

At step 213, the control amount of brake assistance is distributed to the wheels FR, FL, RR, RL. By this distribution, the braking force and target slip rate are properly adjusted for each wheel FR, FL, RR, RL to maintain stable vehicle dynamics.

If the electronic control unit ECU judges in step 208 that one of the ending conditions has been satisfied, step 214 is executed to set the control flag FL to a termination flag F3. At step 215, the electronic control unit ECU determines a duty ratio Dce for the valves SC1, SC2 and a time period Te for the termination period. The duty ratio Dce is selected from a map depending on the decreasing change rate DPmc of the output pressure Pmc. The duty ratio Dce gets larger or increases as the decreasing change rate DPmc gets larger or increases. Further, the time period Te is set to a constant time period (e.g., 0.2 second).

At step 216, the electronic-control unit ECU sets the duty ratio Dce to the value selected in step 215 and also sets another duty ratio to zero % for the valves SI1 and SI2. At step 217, the electronic control unit ECU determines if the time period Te has elapsed. If the time period Te has not yet elapsed, the electronic control unit Ecu returns to the main routine shown in FIG. 3. Otherwise, the electronic control unit ECU executes step 218 to set the control flag FL to a resting flag F0. After step 218, the electronic control unit ECU returns to the main routine shown in FIG. 3.

If the ECU determines in step 202 that the starting condition is not satisfied, the electronic control unit ECU executes step 219 to check if the control flag FL is equal to the termination flag F3. If the control flag FL is equal to the termination flag F3, the electronic control unit ECU executes steps 216, 217 and 218 as described above and returns to the main routine shown in FIG. 3. At step 219, if the control flag FL is not the termination flag F3, the electronic control unit ECU returns to the main routine shown in FIG. 3 because the control flag FL represent the resting mode (i.e., a non-controlling mode).

Figure 5:
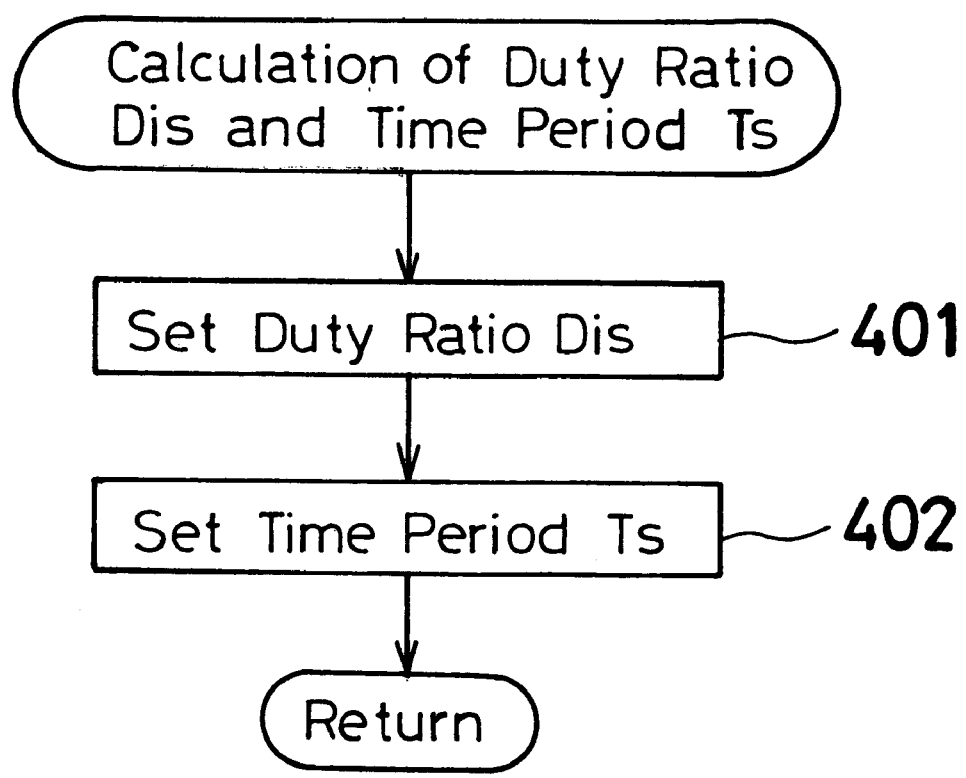
FIG. 5 is a flow chart showing calculations for the initial period of brake assist control in FIG. 4.
Figure 6:
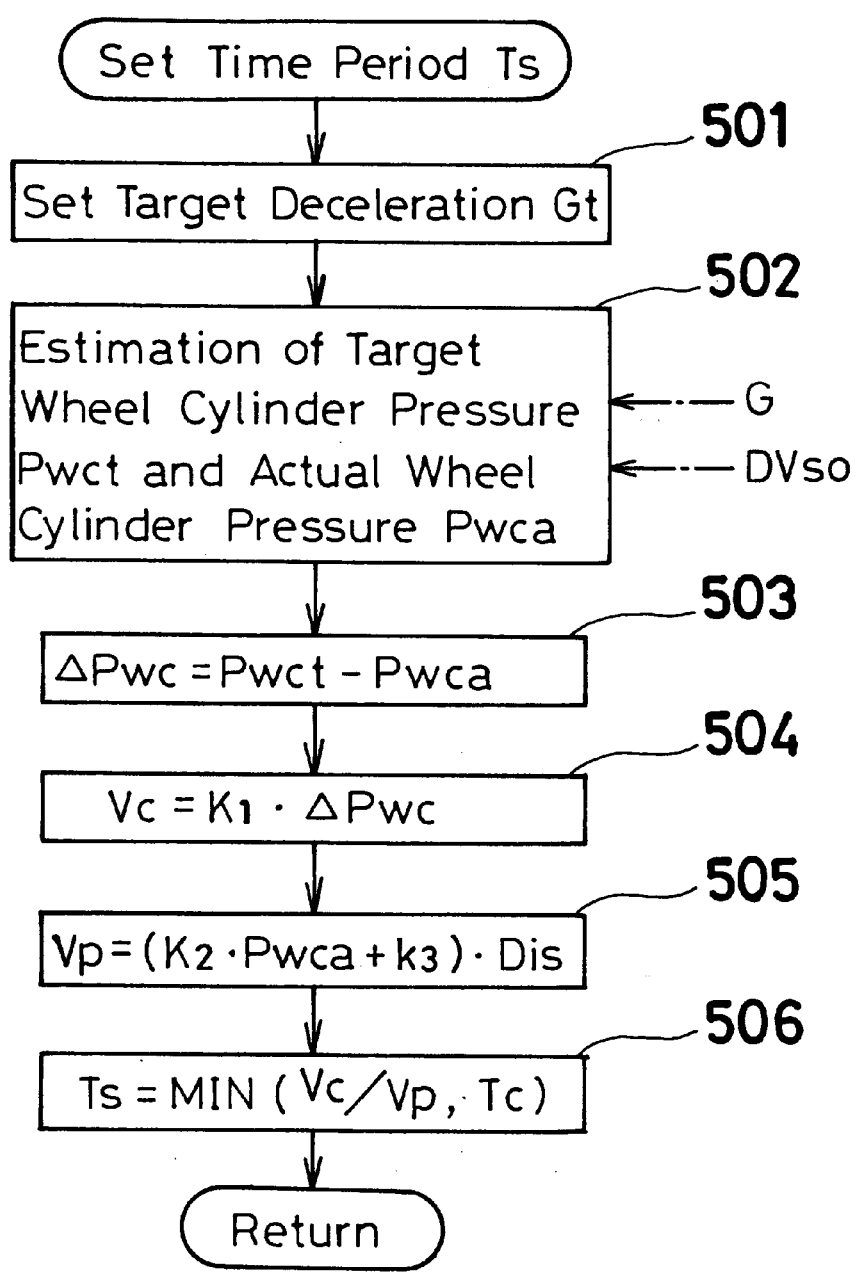
FIG. 6 is a flow chart showing calculations for the time period Ts in the flow chart of FIG. 5.
Figure 11:
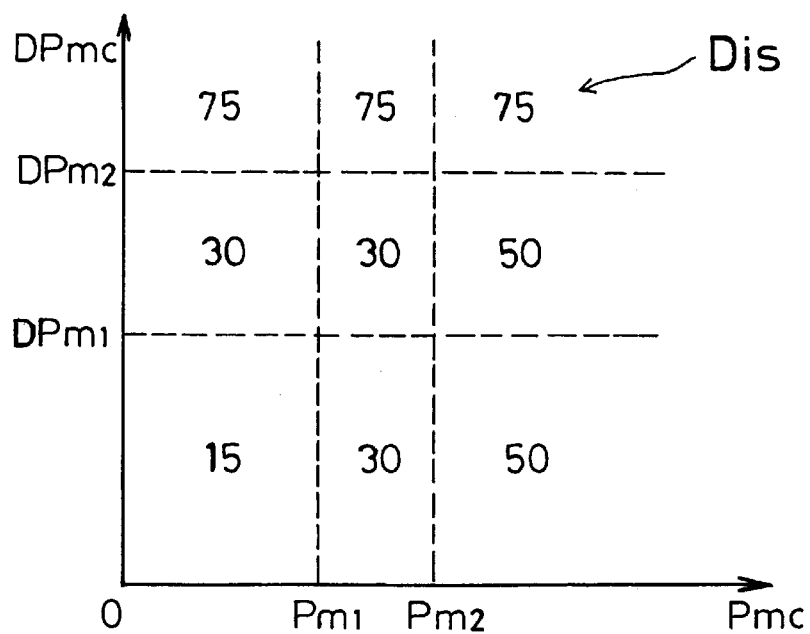
FIG. 11 is a duty ratio map showing the relationship between master cylinder pressure and its deviation.

Referring now to FIGS. 5 and 6, the determination or calculation of the duty ratio Dis and the initial time period Ts is explained. FIG. 5 shows the details associated with step 204 in the flow chart of FIG. 4. At step 401 in FIG. 5, the electronic control unit ECU sets the duty ratio Dis that is selected from a map shown in FIG. 11 based on the output pressure Pmc from the master cylinder MC and its change rate DPmc. The duty ratio Dis gets larger or increases as the output pressure Pmc gets larger or increases. Further, the duty ratio Dis gets larger or increases as the change rate DPmc gets larger or increases. Therefore, the electronic control unit ECU is able to obtain a proper pressure increase rate in accordance with the driver's operation of the brake pedal BP.

Figure 12:
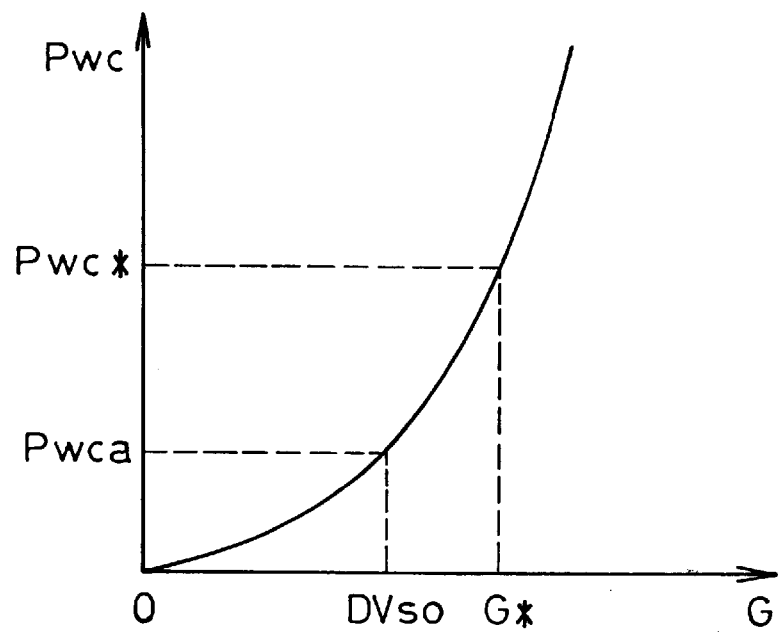
FIG. 12 is a graph showing the relationship between vehicle body deceleration and wheel cylinder pressure.

At step 402, the electronic control unit ECU sets the initial time period Ts. FIG. 6 is a flow chart showing the details of step 402 in the flow chart of FIG. 5. At step 501 in FIG. 6, in a manner similar to the calculation in step 210, the electronic control unit ECU calculates the sum of the vehicle body deceleration Gm and the selected constant deceleration Δg to set the target deceleration Gt. At step 502, by reference to the graph shown in FIG. 12, the electronic control unit ECU estimates a target wheel cylinder pressure Pwct from the target deceleration Gt and also estimates an actual wheel cylinder pressure Pwca from the vehicle body deceleration DVsc. At step 503, the electronic control unit ECU calculates the pressure difference ΔPwc between the target wheel cylinder pressure Pwct and the current wheel cylinder pressure Pwca through use of the formula: ΔPwc=Pwct−Pwca. At step 504, the electronic control unit ECU calculates the target amount Vc of brake fluid based on the pressure difference ΔPwc through use of the formula: Vc=K1·ΔPwc, wherein K1 is a positive constant.

At step 505, the electronic control unit ECU calculates a unit discharge Vp in a unit time based on the duty ratio Dis and the current wheel cylinder pressure Pwca through use of the formula: Vp=(K2·Pwca+K3)·Dis. Here, the constant K2 has a negative value and the constant K3 has a positive value. Further, the current wheel cylinder pressure Pwca corresponds to the load against the discharge of the hydraulic pump HP1. As apparent from the foregoing formula, the unit discharge Vp gets smaller as the load and the current wheel cylinder pressure Pwca get larger. At step 506, the electronic control unit ECU calculates the initial time period Ts. The time period Ts is set to the shorter one of: (a) a time period for supplying the target amount Vc of brake fluid to the wheel cylinders Wfr, Wfl, Wrr, Wrl or (b) a constant time period Tc (e.g., 1 second).

Although the duty ratio Dis is set at step 401 based on the output pressure Pmc and the change rate DPmc for the valves SI1 and SI2, the duty ratio Dis may also be set based on either the output pressure Pmc or the change rate DPmc. Further, it is possible to set the duty ratio Dis based on the stroke of the brake pedal BP or a change rate of the stroke.

Figure 7:
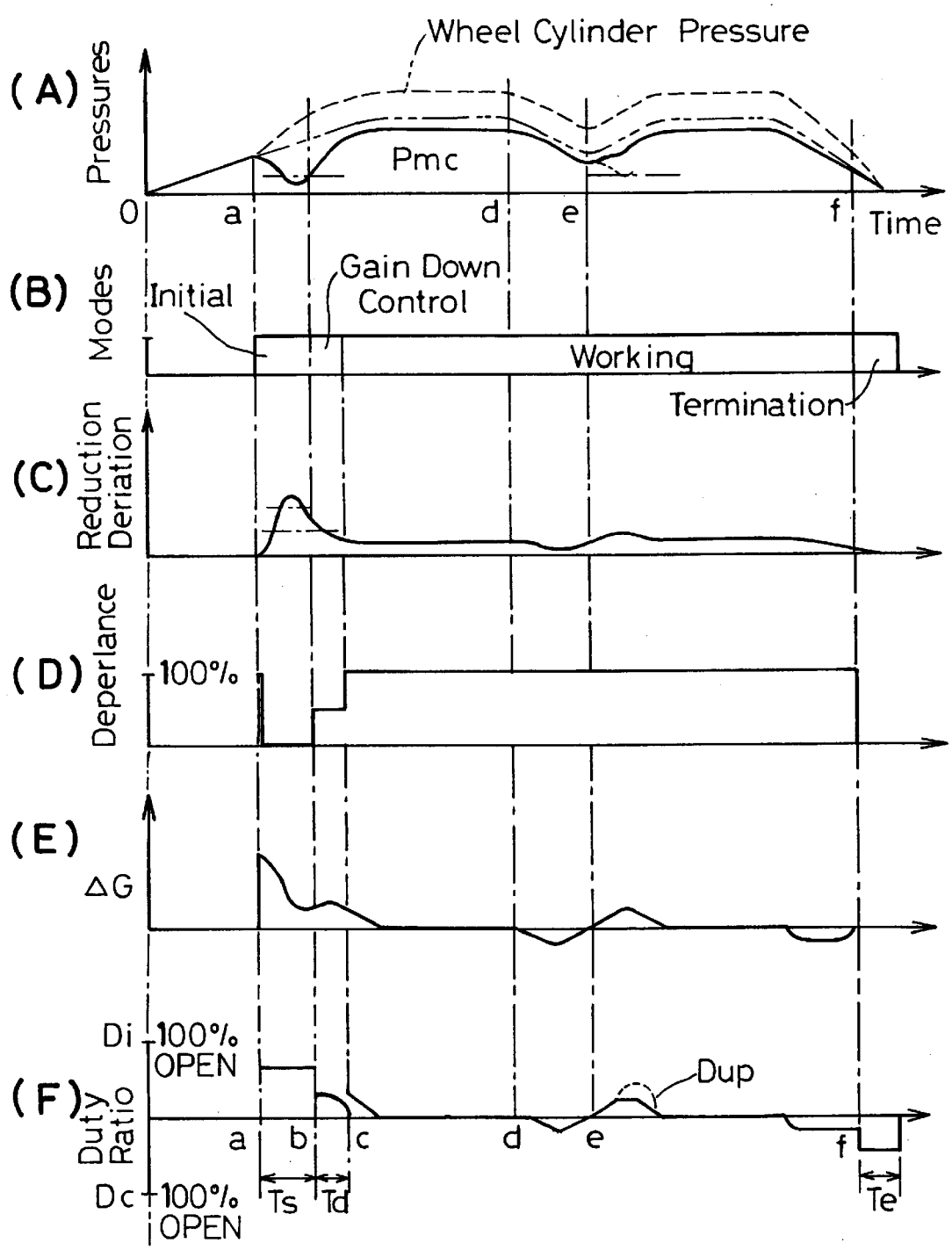
FIG. 7 is a timing chart showing various transitions during brake assist control.

FIG. 7 is a timing chart showing the brake assist control. The chart in FIG. 7(A) shows the transition of the output pressure Pmc from the master cylinder. The output pressure Pmc substantially corresponds to the driver's operation of the brake pedal BP. The solid line shows an exemplary transition of the output pressure Pmc under brake assist control whereas the two-dot chain line shows an exemplary transition without brake assist control. The broken line shows an exemplary transition of the brake pressure in one of the wheel cylinder Wfr, Wfl, Wrr, Wrl under brake assist control. The chart in FIG. 7(B) shows the control modes of the brake assist control. In the chart of FIG. 7(B), the brake assist control starts from the resting period, the initial time period, the gain down control period, the working period, the termination period and the resting period. The chart in FIG. 7(C) shows an exemplary reduction deviation of the output pressure Pmc from the master cylinder MC due to brake assist control. The chart in FIG. 7(D) shows the dependent rate on the pressure sensor PS under brake assist control. The chart in FIG. 7(E) shows an exemplary transition of the supplemental vehicle body deceleration Δg. The chart in FIG. 7(F) shows exemplary transitions of the duty ratios Di and Dc for the valves SI1, SI2, SC1 and SC2.

In FIGS. 7(A)–7(F), the initial time period is begun at point (a) where the output pressure Pmc and the change rate DPmc exceeds the predetermined values. Then, during the time period Ts or between point (a) and point (b), the duty ratio Dis for the valves SI1 and SI2 is maintained at the constant value selected from the map. After the initial time period is completed at point (b), the gain down control is performed so that the duty ratio Di is limited to 50% of the originally selected value during the time period Td or between point (b) and point (c).

Then, the brake pressure control is performed during the working period or between point (c) and point (f) so that the duty ratios Di and Dc are set to proper values in proportion to the supplemental vehicle body deceleration ΔG. In other words, the valves SI1, SI2, SC1, SC2 are alternatively opened and closed based on the duty ratios Di and Dc so that the brake pressure (shown by the dotted line in the chart of FIG. 7(A)) in the wheel cylinder is higher than the output pressure Pmc (shown by the two-dot chain line in the chart of FIG. 7(A)). In the chart of FIG. 7(A), a pressure difference between the dotted line and the two-dot chain line is a constant. However, the actual output pressure Pmc follows the solid line in the chart of FIG. 7(A) so as to be smaller than the two-dot chain line because the brake fluid is drawn in by the hydraulic pumps HP1 and HP2.

When the driver slightly releases the brake pedal BP at point (d), the supplemental vehicle body deceleration ΔG becomes negative (i.e., acceleration). Further, when the driver further depresses the brake pedal BP at point (e), the supplemental vehicle body deceleration ΔG is increased. Further, the duty ratio Di is also increased for the valves SI1 and SI2 as the supplemental vehicle body deceleration ΔG increases. If the duty ratio Di was increased as represented by the dotted line shown in the chart of FIG. 7(F), the output pressure Pmc would be decreased as represented by the dotted line around point (e) in the chart of FIG. 7(A) due to the increased amount of brake fluid drawn in by the hydraulic pumps HP1 and HP2. This causes less counter force to the brake pedal BP so that the driver may feel something wrong. To prevent this, the duty ratio Di is limited so as not to exceed the upper limit Dup as shown by the solid line in the chart in FIG. 7(F) around point (e). Then, when the output pressure Pmc becomes less than the predetermined value at point (f), the termination period Te is begun so that the duty ratio Dce is selected from the map for the valves SC1 and SC2. After the termination period Te, the brake assist control is in the resting period.

Figure 8:
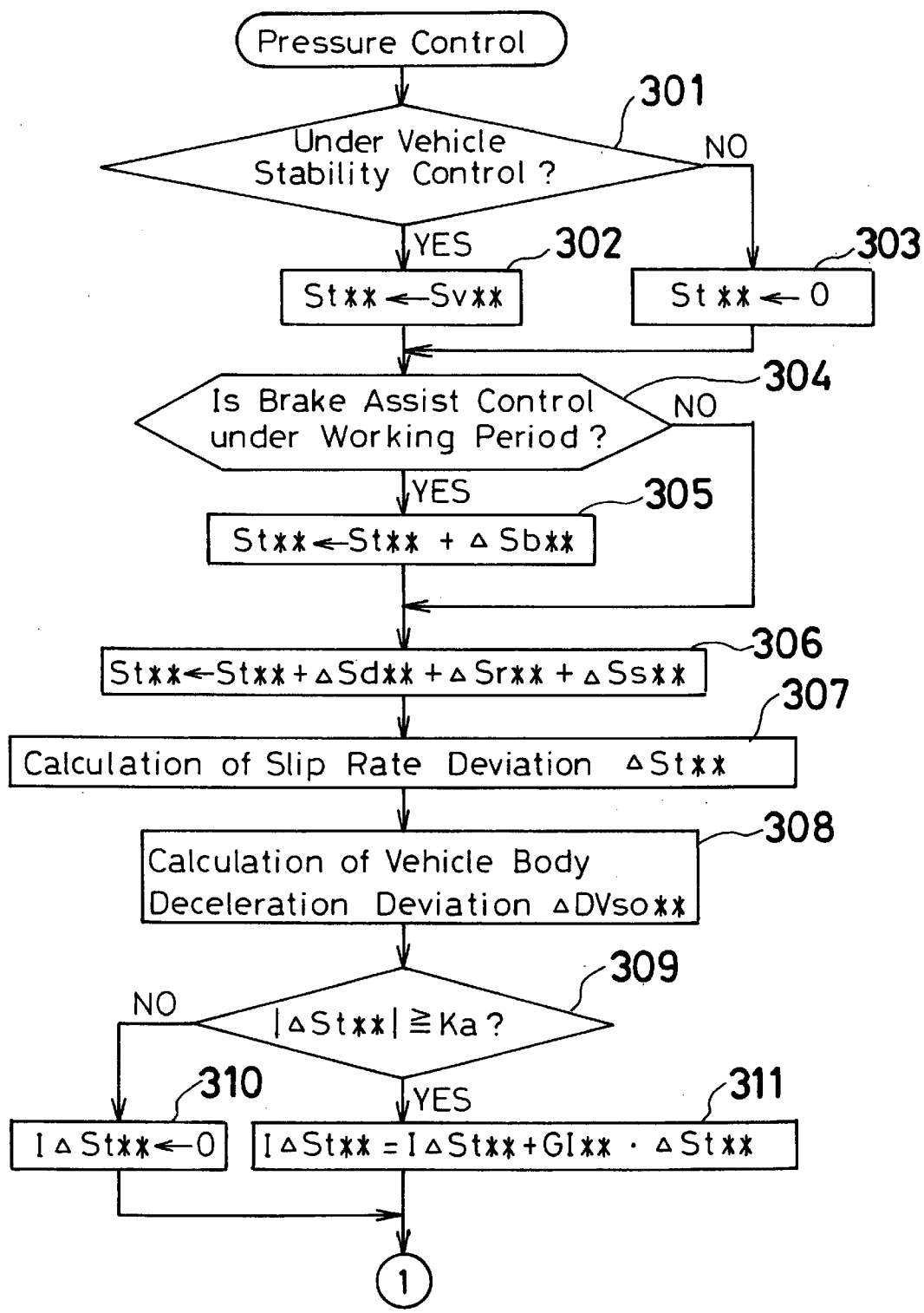
FIG. 8 is a flow chart showing the pressure control step forming a part of the flow chart in FIG. 3.
Figure 9:
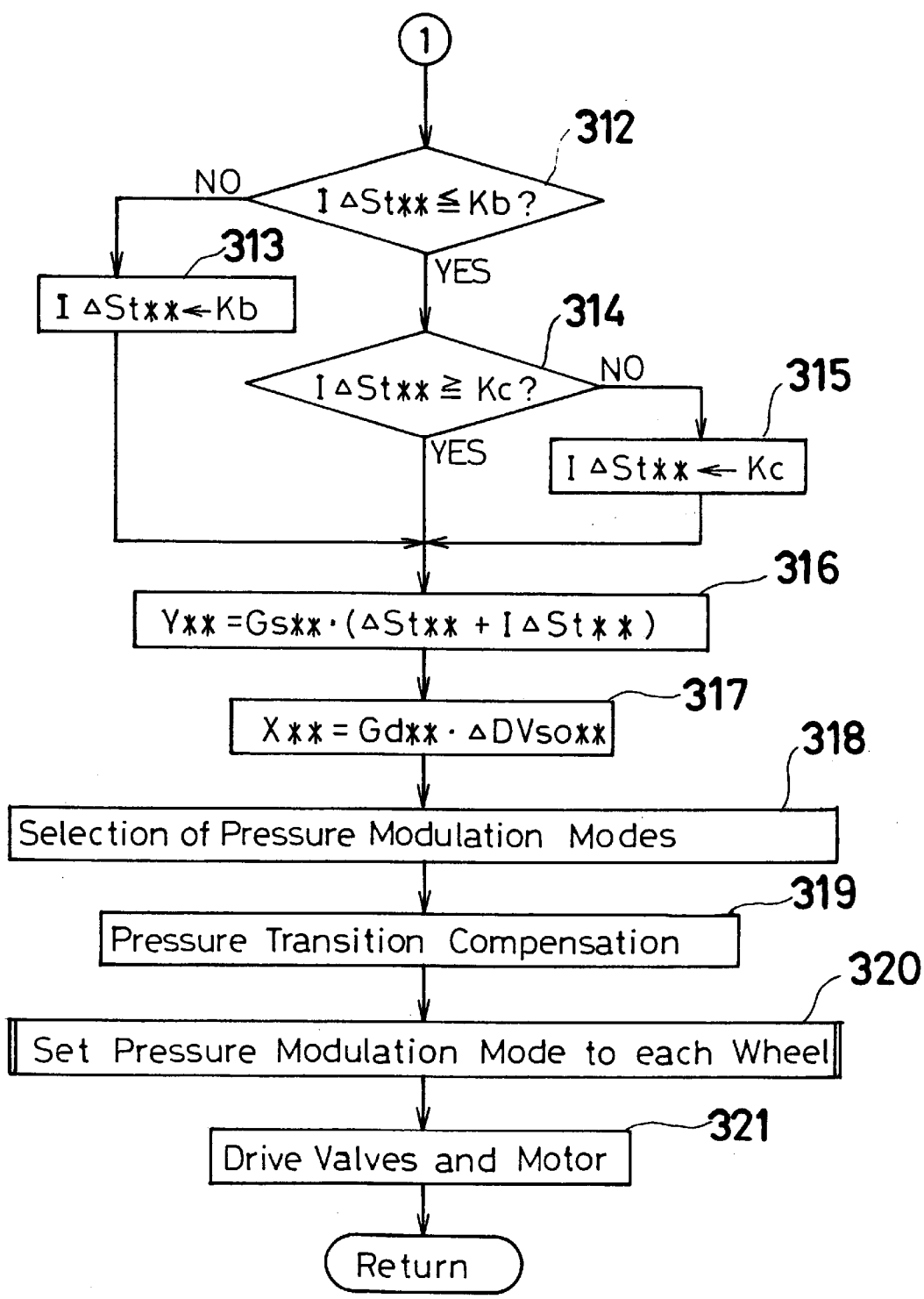
FIG. 9 is a flow chart showing the pressure control step forming a part of the flow chart in FIG. 3.

FIGS. 8 and 9 illustrate the pressure control corresponding to step 109 in FIG. 3 in which the brake pressures in respective wheel cylinders Wfr, Wfl, Wrr, Wrl, are controlled. At step 301, the electronic control unit ECU judges if the vehicle stability control is being performed. If the vehicle stability control is being performed, the electronic control unit ECU executes step 302 to set a predetermined target slip rate Sv for each of the target slip rates St for the wheels FR, FL, RR, RL. If it is determined at step 301 that the vehicle stability control is not being performed, the electronic controller ECU executes step 303 to set each of the target slip rates St to zero. At step 304, the electronic control unit ECU judges if the brake assist control is in the working period (i.e., the control flag FL=F2). If the brake assist control is in the working period, the electronic control unit ECU executes step 305 to add a slip rate compensator ΔSb to each of the target slip rates St. At step 306, the electronic control unit ECU calculates the sum of a fore-aft distribution compensator ΔSd, a slip rate compensator ΔSr for traction control and a slip rate compensator ΔSs for anti-skid control. The electronic control unit ECU then adds the sum to each of the target slip rates St. The fore-aft distribution compensator ΔSd, the slip rate compensator ΔSr and the slip rate compensator ΔSs are set to zero while the related controls are not performed.

At step 307, the electronic control unit ECU calculates slip rate deviations ΔSt for respective wheels FR, FL, RR, RL and at step 308 the electronic control unit ECU calculates a vehicle body deceleration deviation ΔDVso. The slip rate deviations ΔSt represent the differences between the target slip rates St and the actual slip rates Sa (i.e., ΔSt=St−Sa). The body acceleration deviations ΔDVso represent the differences between the vehicle body deceleration DVso and wheel accelerations DVw (i.e., ΔDVso=DVso−DVw). As is known, the actual slip rates Sa and the body acceleration deviations ΔDVso may take various values under various controls and so a detailed explanation is not set forth in detail here.

At step 309, the electronic control unit ECU compares the slip rate deviations Δst with a constant Ka. If the absolute value of the slip rate deviations Δst is greater than or equal to the constant Ka, the electronic control unit ECU executes step 311 to renew an integration IΔST of the slip rate deviations ΔSt. In other words, the present integrations IΔST are the sum of the last integration IΔST and the product resulting from multiplying the present slip rate deviations ΔSt and the gains GI. In case the absolute value of the slip rate deviations |ΔSt| is less than the constant Ka, the electronic control unit ECU clears the integration IΔST at step 310. At steps 312, 313, 314 and 315, the integrations IΔST are limited within the range between the upper limit Kb and the lower limit Kc (i.e., Kc≦IΔSt≦Kb). At step 313, the electronic control unit ECU sets the upper limit Kb to the integration IΔst if the integration IΔST exceeds the upper limit Kb. At step 315, the electronic control unit ECU also sets the lower limit Kc to the integration IΔST if the integration IΔSt is less than the lower limit Kc.

At step 316, the parameters Y are calculated through use of the formula: Y=Gs·(Δst+IΔst) for various brake pressure controls. At step 317, another set of parameters X is calculated through use of the formula: X=Gd·ΔDVso. Here, the gains Gs and Gd are predetermined values.

Figure 14:
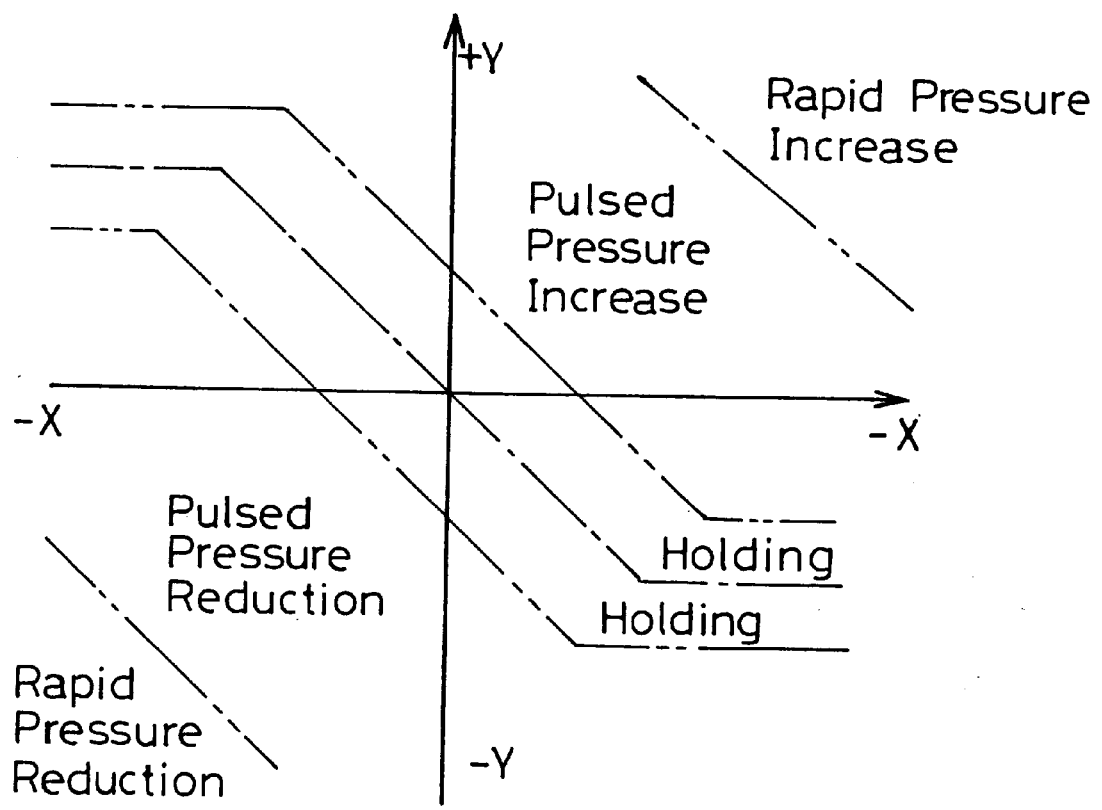
FIG. 14 is a graph showing the relationship between pressure modulation modes and parameters for brake pressure control.

At step 318, the electronic control unit ECU selects one of the pressure modulation modes shown in FIG. 14 based on the parameters X and Y. FIG. 14 is a graph showing the relationship between the pressure modulation modes and the parameters X, Y for brake pressure control. Based on the parameters X and Y, the electronic control unit ECU selects one area from amongst a rapid pressure reduction area, a pulsed pressure reduction area, holding areas, a pulsed pressure increase area and a rapid pressure increase area. In case none of the brake pressure controls is being performed, no pressure modulation mode is selected.

In case the pressure modulation mode is switched from reduction to increase or from increase to reduction, the electronic control unit ECU executes step 319 to produce a smooth brake pressure transition. For example, when the electronic control unit ECU switches the pressure modulation mode from the rapid reduction mode to the pulse increase mode, the rapid increase mode is first performed for a time period depending on the duration of the last rapid reduction mode. At step 320, the selected pressure modulation modes are set to each wheel FR, FL, RR and RL with relation to the other wheels. For example, in case the electronic control unit ECU employs a so called low-select method for the rear wheels RR and RL, the electronic control unit ECU controls the brake pressure based on the lower speed wheel.

At step 321, the electronic control unit ECU drives the valves SI1, SI2, SC1, SC2 and the electric motor M based on the duty ratios Di and Dc determined at steps 205, 212 and 216. Further, at step 321, the electronic control unit ECU also drives the modulator valves PC1, PC2, PC3, PC4, PC5, PC6, PC7, PC8 to adjust the braking forces of the wheels FR, FL, RR, RL.

In this embodiment, the duty ratio Dis is determined based on the output pressure Pmc detected by the pressure sensor PS when the brake assist control is judged to be necessary. The brake pressure controller BC immediately drives the second valve with the determined duty ratio Dis so that the pressure is promptly increased in the wheel cylinders Wfr, Wfl, Wrr, Wrl in accordance with the driver's operation of the brake pedal BP.

The brake control apparatus of the present invention is advantageously able to simultaneously perform brake assist control and anti-skid control. In addition, the brake control apparatus permits an increase in the brake pressure in a wheel cylinder immediately after initiation of brake assist control. Further, the brake control apparatus advantageously controls the brake pressure in a wheel cylinder according to a driver's brake pedal operation.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A brake control apparatus comprising:

a wheel cylinder for applying a brake force to a wheel;

a master cylinder for generating pressurized brake fluid in accordance with operation of a brake pedal;

a main line connecting the master cylinder to the wheel cylinder;

a first valve for opening and closing the main line;

a pump having an inlet port and an outlet port to supply a pressurized brake fluid to a point of the main line between the first valve and the wheel cylinder;

an auxiliary line connecting the inlet port of the pump to the master cylinder;

a second valve for opening and closing the auxiliary line;

a brake operation sensor for detecting operation of the brake pedal;

initiation judging means for judging a need for brake assist control based on a detection by the brake operation sensor of the operation of the brake pedal;

a controller to control the first valve, the second valve and the pump to perform the brake assist control when the initiation judging means judges a need for brake assist control;

the controller including duty determination means for determining a duty ratio for the second valve based on a change rate of an operation amount of the brake pedal and duty control means for controlling the second valve with the duty ratio determined by the duty ratio determination means.

2. The apparatus according to claim 1, wherein the duty control means drives the second valve for a set time period.

3. The apparatus according to claim 2, wherein the controller includes:

deceleration detecting means for detecting a vehicle body deceleration;

target setting means for determining a target deceleration based on the operation of the brake pedal detected by the brake operation sensor; and supplemental deceleration calculating means for calculating a difference between the target deceleration and the vehicle body deceleration, said duty control means driving the second valve based on the difference after the set time period.

4. The apparatus according to claim 2, wherein the controller includes:

determination means for determining a target amount of brake fluid supplied to the wheel cylinder based on the operation of the brake pedal detected by the brake operation sensor; and estimating means for estimating a unit discharge of the pump in a unit time based on the duty ratio, the set time period set by the duty control means being determined by a time period for supplying the target amount of the brake fluid to the wheel cylinder.

5. The apparatus according to claim 1, wherein the controller closes the first valve when the target deceleration is larger than the vehicle body deceleration and the difference is positive.

* * * * *